No. 745,246. PATENTED NOV. 24, 1903.
M. SENSENSCHMIDT.
MEANS OR APPARATUS FOR MOLDING METAL TUBES.
APPLICATION FILED AUG. 11, 1902.
NO MODEL. 4 SHEETS—SHEET 4.
*Fig. 4*
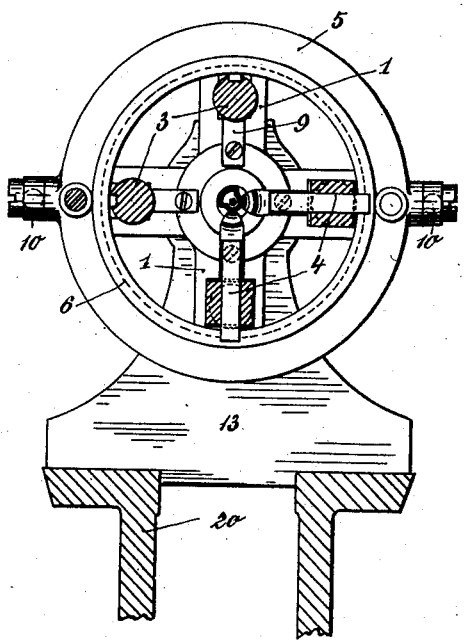
*Fig. 5*     *Fig. 6*
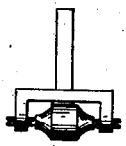 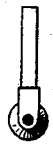
Witnesses
Jas. A. G. Koehl.
L. O. Hilton
Inventor
Max Sensenschmidt
By H. B. Willson
Attorney No. 745,246. Patented November 24, 1903.

UNITED STATES PATENT OFFICE.

MAX SENSENSCHMIDT, OF FRANKFORT-ON-THE-MAIN, GERMANY.

MEANS OR APPARATUS FOR MOLDING METAL TUBES.

SPECIFICATION forming part of Letters Patent No. 745,246, dated November 24, 1903.

Application filed August 11, 1902. Serial No. 119,295. (No model.)

*To all whom it may concern:*

Be it known that I, MAX SENSENSCHMIDT, engineer, a subject of the King of Prussia, Emperor of Germany, residing at Adalbertstrasse 19, Frankfort-on-the-Main, in the Kingdom of Prussia and Empire of Germany, have invented certain new and useful Improvements in Means or Apparatus for Molding Metal Tubes, of which the following is a full, clear, and exact description.

My invention is an improved machine for shaping copper, brass, and other tubes; and it consists in the peculiar construction and combination of devices hereinafter fully described and claimed.

The object of my invention is to provide a machine by means of which brass, copper, and other tubes may be shaped as may be desired by the action of shaping-tools which bear upon the tubes and which rotate with reference thereto.

Figure 1:
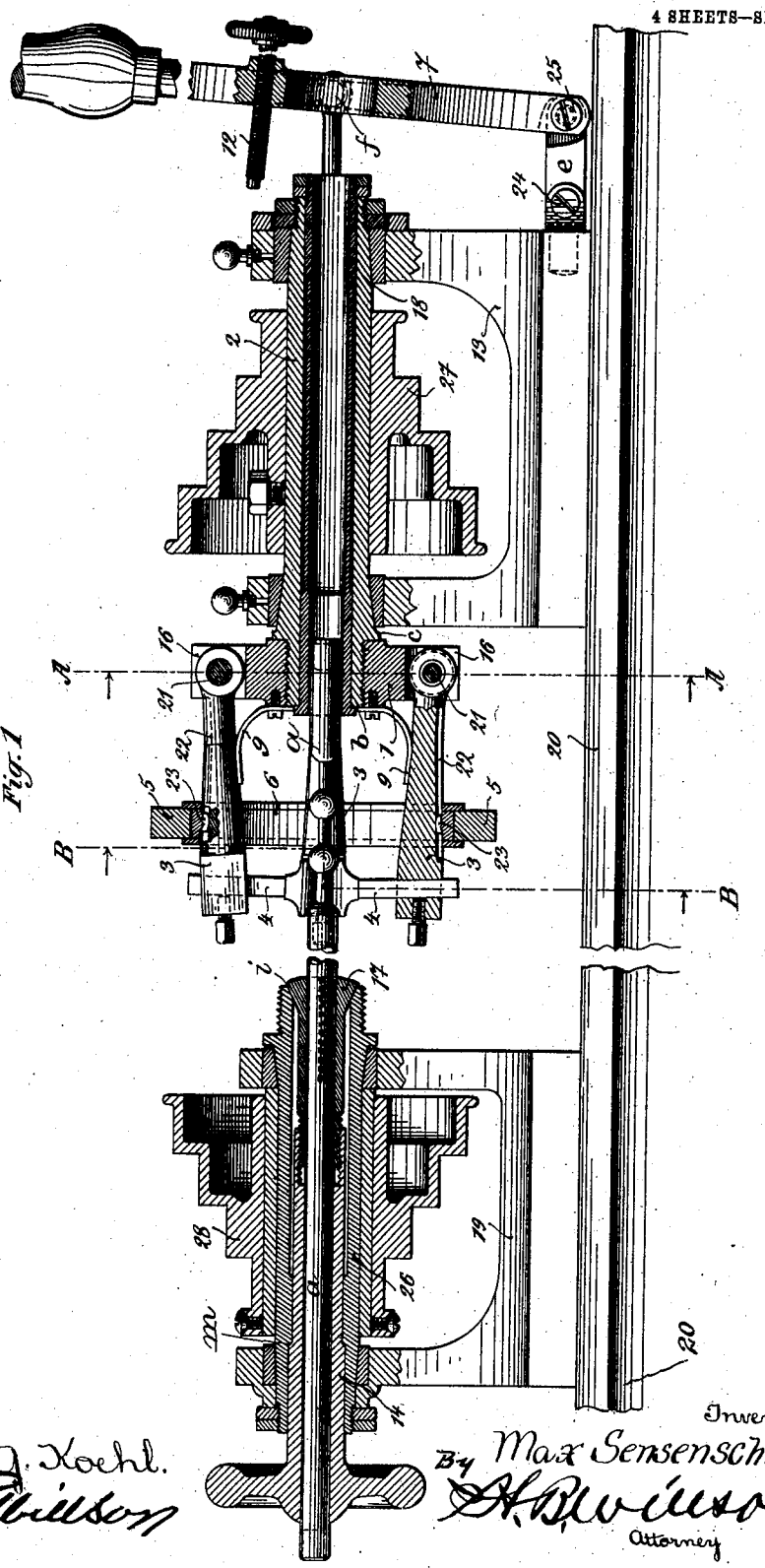
Figure 2:
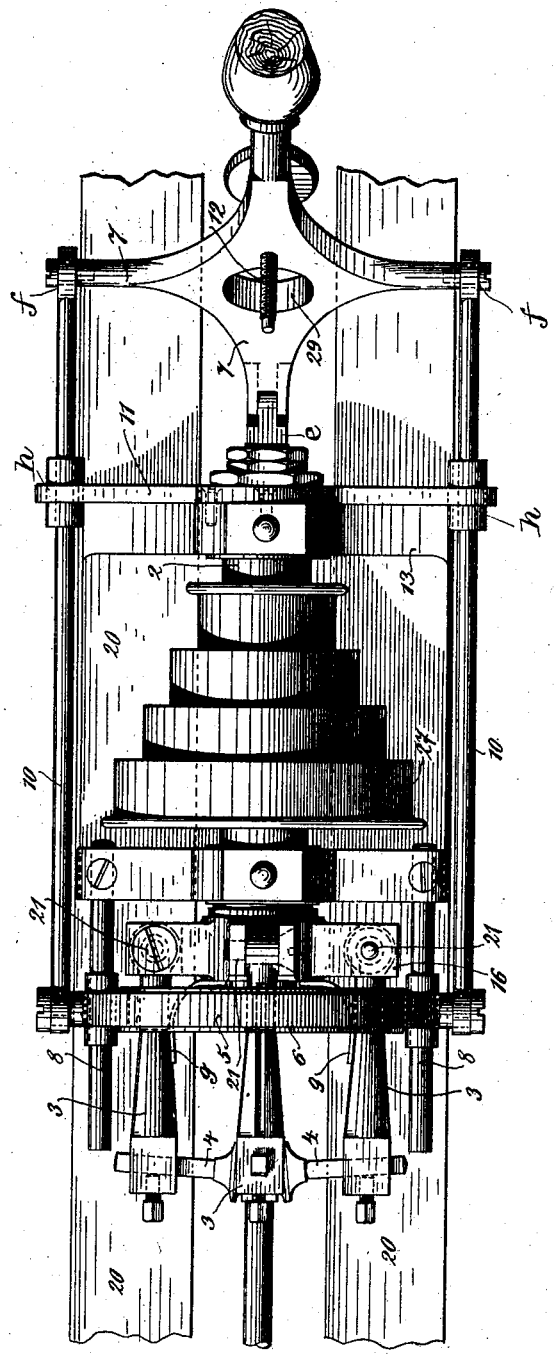
Figure 3:
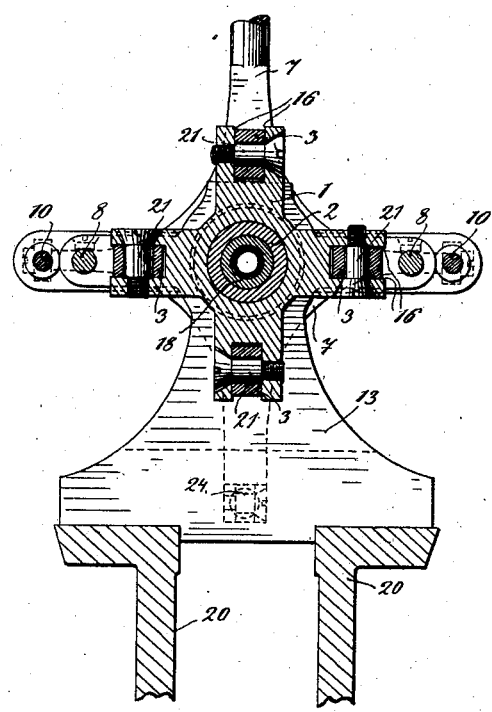

In the accompanying drawings, Figure 1 is a vertical longitudinal central sectional view of a tube-shaping machine embodying my improvements. Fig. 2 is a top plan view of the same. Fig. 3 is a vertical transverse sectional view of the same, taken on the plane indicated by the line A A of Fig. 1. Fig. 4 is a similar view, taken on the plane indicated by the line B B of Fig. 1, and Figs. 5 and 6 are detail views of shaping-tools adapted to be employed in connection with my improved machine.

Referring to the drawings, the reference-numeral 20 indicates a supporting-bed on which are slidably mounted a pair of supports 13 19, which are longitudinally movable on the bed toward and from each other, so that they may be spaced at any desired distance apart. Each of the said slidable supports is provided at its ends with standards having bearings, as shown in Fig. 1. In the bearings of the support 13 is journaled a sleeve 2, one end of which, which I will term the "inner" end, being provided with a screw-threaded portion $b$ and a circular flange $c$. In the sleeve 2 is a sleeve 18, which extends therethrough and is revoluble therein and is prevented from moving longitudinally therein by a flange at its inner end and a nut which is screwed to its outer end and bears against the outer end of the sleeve 2, as shown clearly in Fig. 1. To reduce friction between the sleeve 18 and the sleeve 2, the former has its portion intermediate its ends reduced in diameter to be out of contact with the sleeve 2, as shown. On the latter, between the standard portions of the support 13, is secured a cone-pulley 27.

To the inner end of the sleeve 2 is screwed a head 1, which is provided with radial arms 16, bifurcated at their outer ends and to which are pivotally connected tool-carrying arms 3 by means of pivot-bolts 21. Springs $g$, which are secured to the head 1, bear against the inner sides of the tool-carrying arms and serve to move the outer ends of the latter radially and from each other. Each of the said tool-carrying arms is provided near its outer side with a longitudinal slot or groove 22, which is engaged by an inwardly-extending stud 23 of an annulus 6, the latter connecting the tool-carrying arms together, as shown in Figs. 1 and 4. The tool-carrying arms taper toward their pivotal ends. Hence by shifting the annulus 6 longitudinally on the said tool-carrying arms the free ends of the latter may be adjusted toward and from each other, as will be understood. The shaping-tools 4, which are carried by the arms 3, are here shown as having shanks which extend through transverse openings in said tool-carrying arms and are clamped therein by means of set-screws. These tools may be of any shape required by the desired form or forms to be imparted to the tube by the operation of the machine and are adapted to bear on the tube constituting the work and by the revolution of the head 1 to act frictionally upon and compress the work-tube, which is more or less ductile, and hence impart the desired form thereto. The work-tube is indicated by the letter $a$.

To the slidable support 13, at the outer end thereof, is connected a tool-shaping lever 7 by means of a link $e$, which is pivotally connected to said support, as at 24. The annulus 6 is provided with an exterior annular circumferential groove which is engaged by a shifting ring 5. The latter is provided with transverse openings for the reception of guides 8, which project from the support 13, and is connected by means of link-rods 10 to the lever 7, as at $f$, Figs. 1 and 2, the said link-rods operating in and being under all conditions retained in a horizontal position by guides *h*, with which the support 13 is provided. The link *e*, which forms the connection between the lever 7 and support 13, enables said lever to shift its position as may be required to operate the annulus 6 and ring 5 to shift or adjust the shaping-tools and the arms 3, which carry them. The said lever 7 is provided with an adjusting-screw 12, which by engagement with the support 13 limits the movement of the lever 7 and predetermines the adjustment of the shaping-tools and their carrying-arms as may be required.

In the bearings of the support 19 is journaled a sleeve 26. The inner end thereof is tapered interiorly, as at *i*, and the said sleeve, while free to rotate in the bearings, is prevented from moving longitudinally therein by the construction shown in Fig. 1. A sleeve 14 extends partly through the sleeve 26, from the outer end thereof, and is prevented from moving longitudinally therein by a shoulder *m*. The said sleeve 14 may be rotated by any suitable means, a hand-wheel being in practice provided for this purpose, as shown. To reduce friction between the sleeve 14 and the sleeve 26, the major portion of the bore of the latter is of greater diameter than the exterior diameter of the sleeve 14. The latter is internally screw-threaded for a suitable distance from its inner end and engages the screw-threaded end portion of an expansible clutch-sleeve 17, which has a conical head that coacts with the conical portion *i* of the sleeve 26 to grip or release the tube *a*, constituting the work, according to the direction in which the clutch-sleeve 17 is moved, by turning the sleeve 14. On the sleeve 26 is secured a cone-pulley 28, by means of which rotary motion may be imparted thereto and to the sleeve 14, clutch-sleeve 17, and the work-tube carried thereby.

In practice the work-tube is preferably filled with water or sand and its ends plugged before it is placed in the machine. The work-tube is passed through the sleeve 14 and the clutch-sleeve and also is passed partly into the sleeve 18 to the desired extent and according to that portion thereof to be operated upon by the shaping-tools 4, and when the work-tube has been thus adjusted it is secured against further longitudinal movement by turning the sleeve 14, by means of its hand-wheel hereinbefore mentioned, to cause the clutch-sleeve 17 to clutch and hold the work-tube. The shaping-tools having been properly adjusted and caused to bear against the work-tube by means of the lever 7 and the connections hereinbefore described, rotary motion is imparted to the head 16 and sleeve 26 by means of the cone-pulleys and the power-belts which engage them, said cone-pulleys being driven in opposite directions to create maximum friction between the work-tools or shaping-tools and the tube *a*. The latter is shifted longitudinally from time to time as may be required to give it the desired form, and when completed it is drawn from the machine through the sleeve 18 and through an opening 29 with which the lever 7 is provided to clear it. The interior sleeve 18 is provided to form a bearing for the work-tube to keep the latter from being sprung while in process of shaping.

From the foregoing description, taken in connection with the accompanying drawings, the construction, mode of operation, and advantages of this invention will be readily apparent, it is thought, without requiring a more extended explanation.

Various changes in the form, proportion, and the minor details of construction may be resorted to without departing from the principle or sacrificing any of the advantages of my invention.

What I claim, and desire to secure by Letters Patent, is—

1. In a machine of the class described, the combination of a revoluble sleeve, bearings therefor, a head carried thereby, tool-carrying arms pivotally connected to said head, springs to move said arms outwardly, a shifting ring connected to and movable longitudinally on said arms, to move them inwardly against the tension of said spring, a lever and connections between it and the shifting ring, whereby the latter may be operated by the lever, substantially as described.

2. In a machine of the class described, the combination of a revoluble sleeve, bearings therefor, a head carried and revolved thereby, tool-carrying arms pivotally connected to said head, a shifting ring connected to and revoluble with said arms, a non-revoluble annulus on said shifting ring, a lever, and connections between the same and the annulus, to move the latter and the shifting ring, substantially as described.

3. In a machine of the class described, the combination of a revoluble sleeve, bearings therefor, a head carried thereby, tool-carrying arms pivotally connected to said head, a shifting ring connected to said arms, a lever, adjustable means to predetermine the throw thereof in one direction, and connections between said lever and the shifting ring, substantially as described.

4. In a machine of the class described, the combination of a revoluble sleeve, bearings therefor, a head carried thereby, tool-carrying arms pivotally connected to said head, a shifting ring connected to said arms, a lever, means to predetermine the throw thereof in one direction, and connections between said lever and the shifting ring, substantially as described.

In witness whereof I subscribe my signature in presence of two witnesses.

MAX SENSENSCHMIDT.

Witnesses:
ADOLF BACHNER,
GEORG FRANZ GOERDSKY.